(12) United States Patent
Chong

(10) Patent No.: US 11,857,388 B1
(45) Date of Patent: Jan. 2, 2024

(54) ALIGNER PLACEMENT SYSTEM AND METHOD OF USE

(71) Applicant: Christopher Chong, San Francisco, CA (US)

(72) Inventor: Christopher Chong, San Francisco, CA (US)

( * ) Notice: Subject to any disclaimer, the term of this patent is extended or adjusted under 35 U.S.C. 154(b) by 1205 days.

(21) Appl. No.: 16/389,051

(22) Filed: Apr. 19, 2019

Related U.S. Application Data

(60) Provisional application No. 62/718,882, filed on Aug. 14, 2018.

(51) Int. Cl.
*A61C 7/02* (2006.01)

(52) U.S. Cl.
CPC .................... *A61C 7/023* (2013.01)

(58) Field of Classification Search
CPC ............ A61B 17/17; A61C 7/02; A61C 7/023
USPC ............................................. 433/3, 24, 141
See application file for complete search history.

(56) References Cited

U.S. PATENT DOCUMENTS

| | | | |
|---|---|---|---|
| 10,307,223 B1* | 6/2019 | Aronson | A61C 7/023 |
| 2009/0246732 A1* | 10/2009 | Creasman | A61C 7/02 433/141 |
| 2011/0045427 A1* | 2/2011 | DeSanti | A61C 7/02 433/24 |
| 2013/0130199 A1* | 5/2013 | Palm | A61C 3/00 433/173 |
| 2015/0266710 A1* | 9/2015 | Camp | B67B 7/16 81/3.55 |

* cited by examiner

*Primary Examiner* — Yogesh P Patel
(74) *Attorney, Agent, or Firm* — Leavitt Eldredge Law Firm

(57) ABSTRACT

An aligner placement system allows for precise holding of a hook or other tool to carefully place, position or remove a dental device, like an aligner, in the mouth. The system uses a handle end that is configured to allow a person to firmly grip the system and hold it in the desired position to properly seat the dental device.

1 Claim, 5 Drawing Sheets

ALIGNER PLACEMENT SYSTEM AND METHOD OF USE

BACKGROUND

1. Field of the Invention

The present invention relates generally to dental care systems, and more specifically, to an aligner placement system for inserting or removing a tray or other device from a set of teeth.

2. Description of Related Art

Dental care systems are well known in the art and are effective means to care or repair teeth. For example, FIG. 1 depicts a conventional aligner device 101 having a channel 103 that matches the current or intended location of a person's teeth 105. During use, the channel 103 is placed on the teeth 105 by the fingers of the person. To remove the channel 103, the fingers or their nails are used to pull or pry the channel from the mouth. It is also common to use a probe 107 to pry, push or otherwise manipulate the channel 103 to ensure a good fit to the teeth 105

One of the problems commonly associated with device 101 is its limited efficiency. For example, when using the nails to pry on the channel 103 the nails slip and injure the gums or other tissue. The use of the fingers also introduces germs or other debris to the mouth.

In addition, the use of a probe 107 to adjust the channel 103 is inefficient because of the limited ability to manipulate the probe without causing injury to the person or damage to the channel 103.

Accordingly, although great strides have been made in the area of aligner devices 101, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
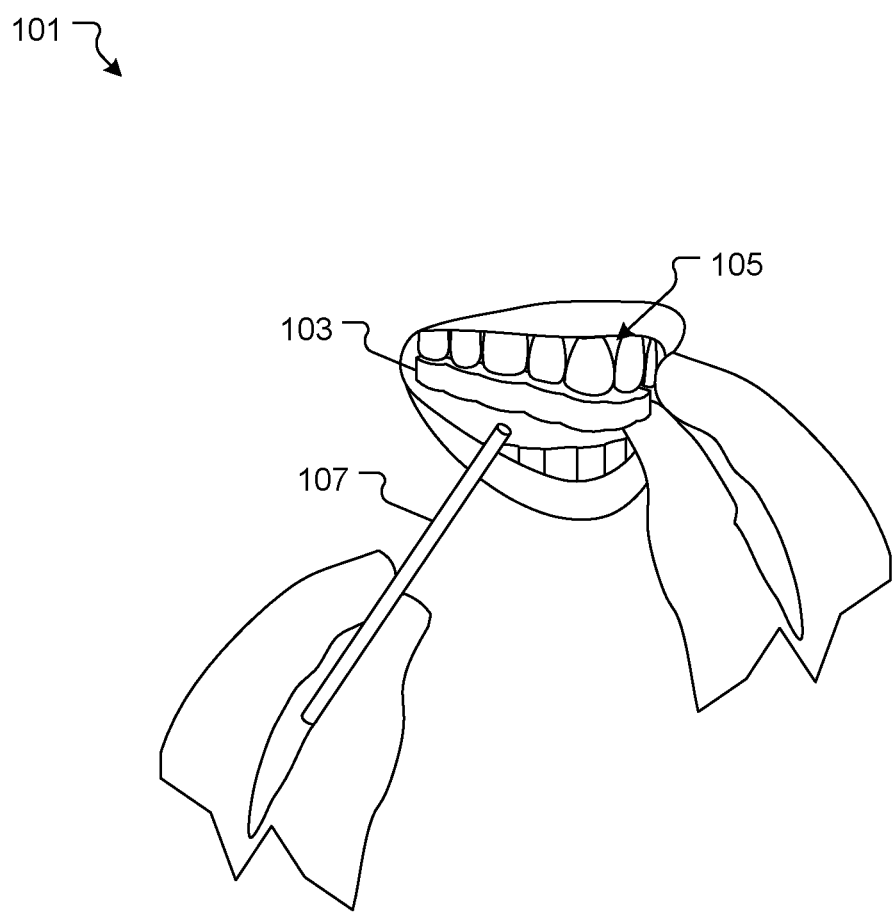
FIG. 1 is a front view of a common aligner device.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional aligner devices. Specifically, the invention of the present application allows for inserting or removing an aligner or other dental device without introducing germs or damaging the person. In addition, the invention configuration allows for precise placement or alteration to the position of the aligner without damage thereto. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
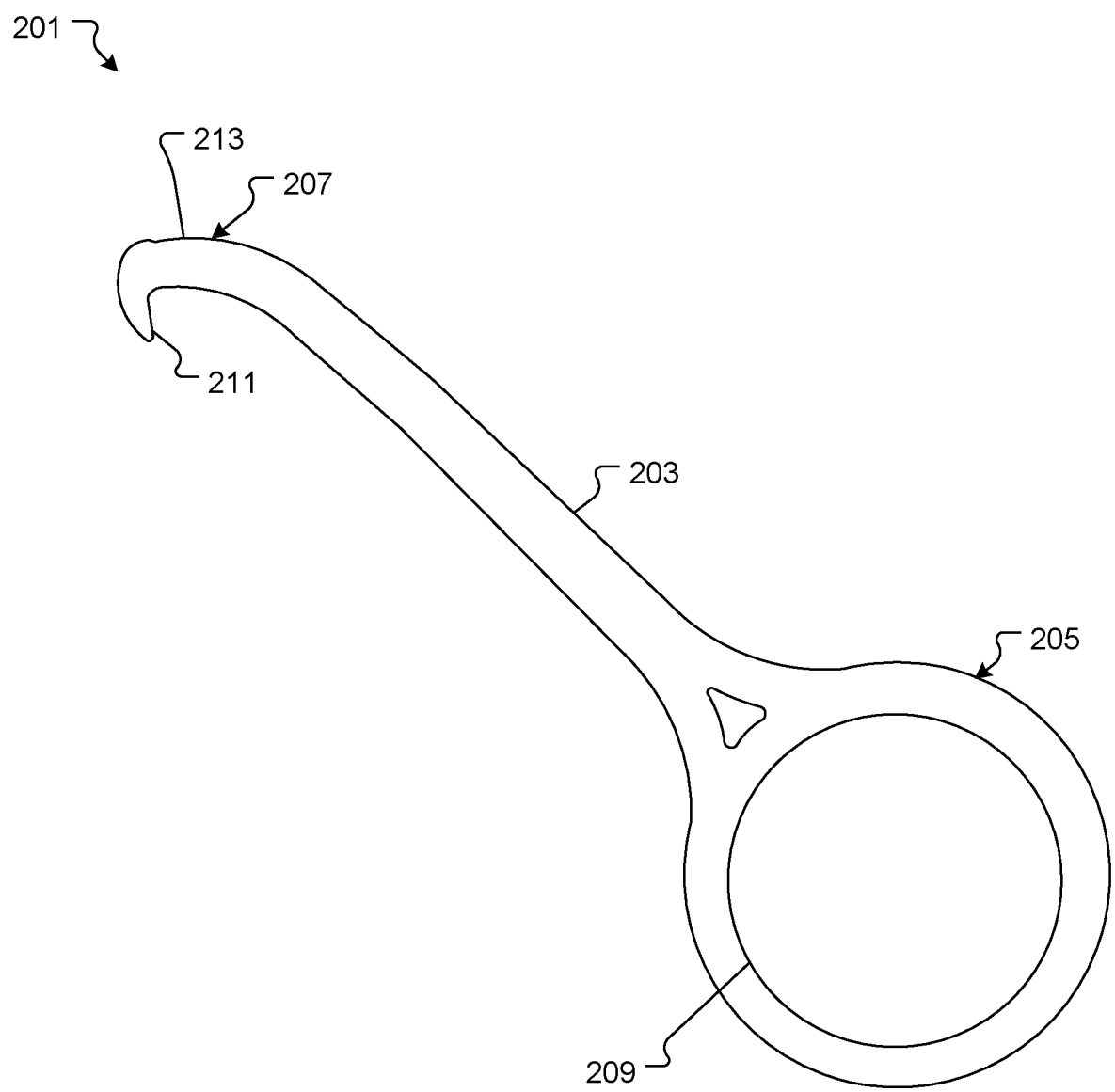
FIG. 2 is a front view of an aligner placement system in accordance with a preferred embodiment of the present application.

Referring now to the drawings wherein like reference characters identify corresponding or similar elements throughout the several views, FIG. 2 depicts a front view of an aligner placement system in accordance with a preferred embodiment of the present application. It will be appreciated that system 201 overcomes one or more of the above-listed problems commonly associated with conventional aligner devices.

In the contemplated embodiment, system 201 includes a body 203 having a handle end 205 and a placement end 207. It is contemplated that the handle end 205 includes a hole 209 through which the finger or a portion thereof passes.

Figure 3:
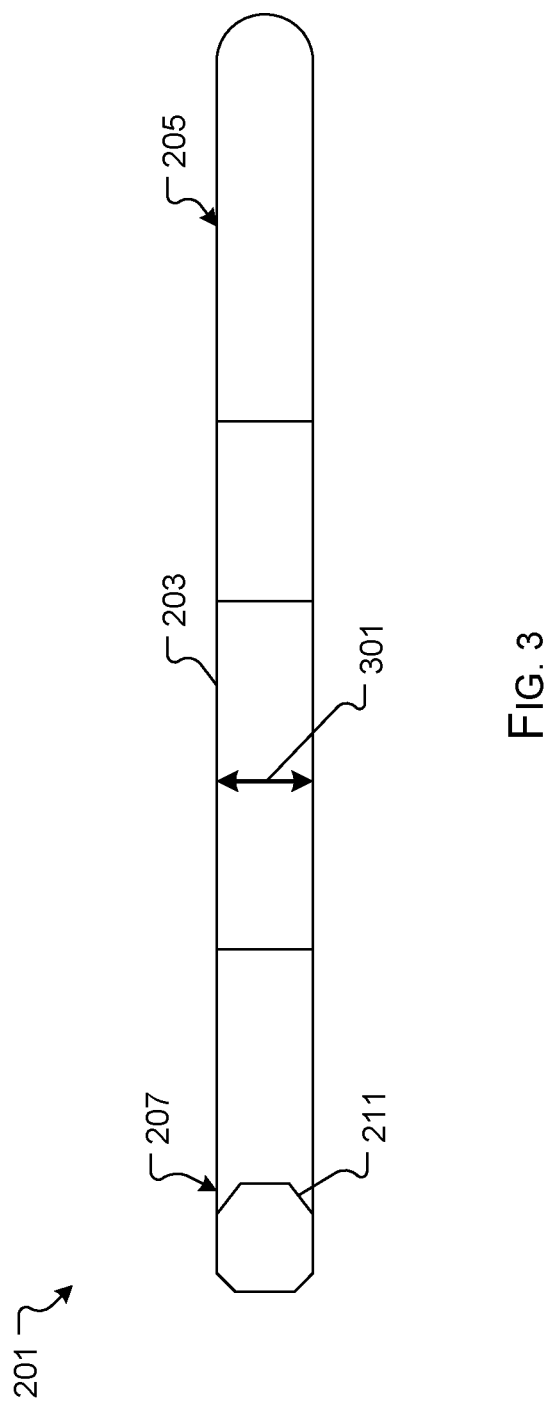
FIG. 3 is a side view of the system of FIG. 2.

The placement end 207 includes a hook 211 that extends out and away from the body 203 so as no not increase the total thickness 301 thereof as depicted by FIG. 3. It is contemplated that the hook 211 is attached to the body 203 via a rounded support 213.

Figure 4:
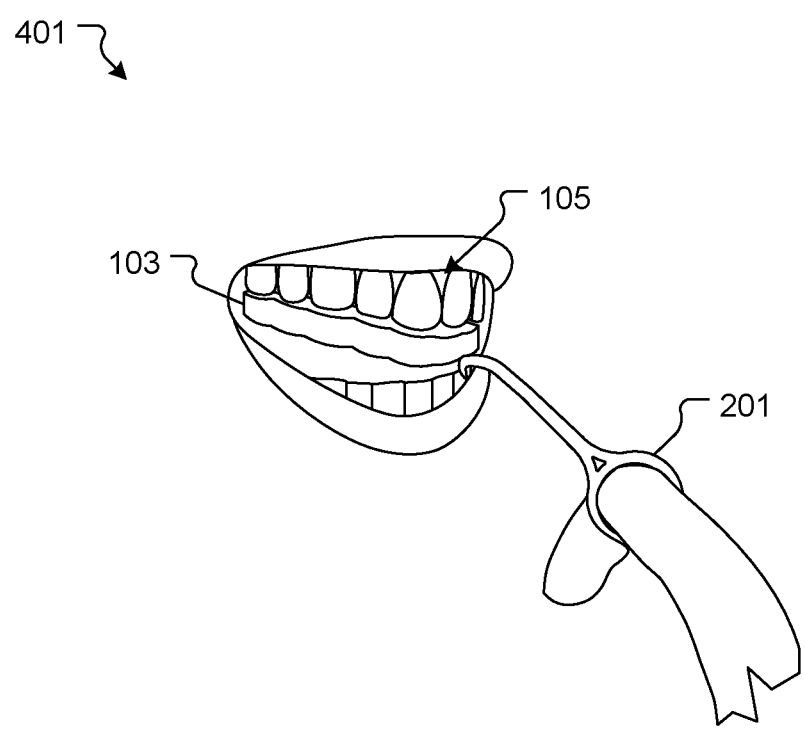
FIG. 4 is a front view of the system of FIG. 2 in use.
Figure 5:
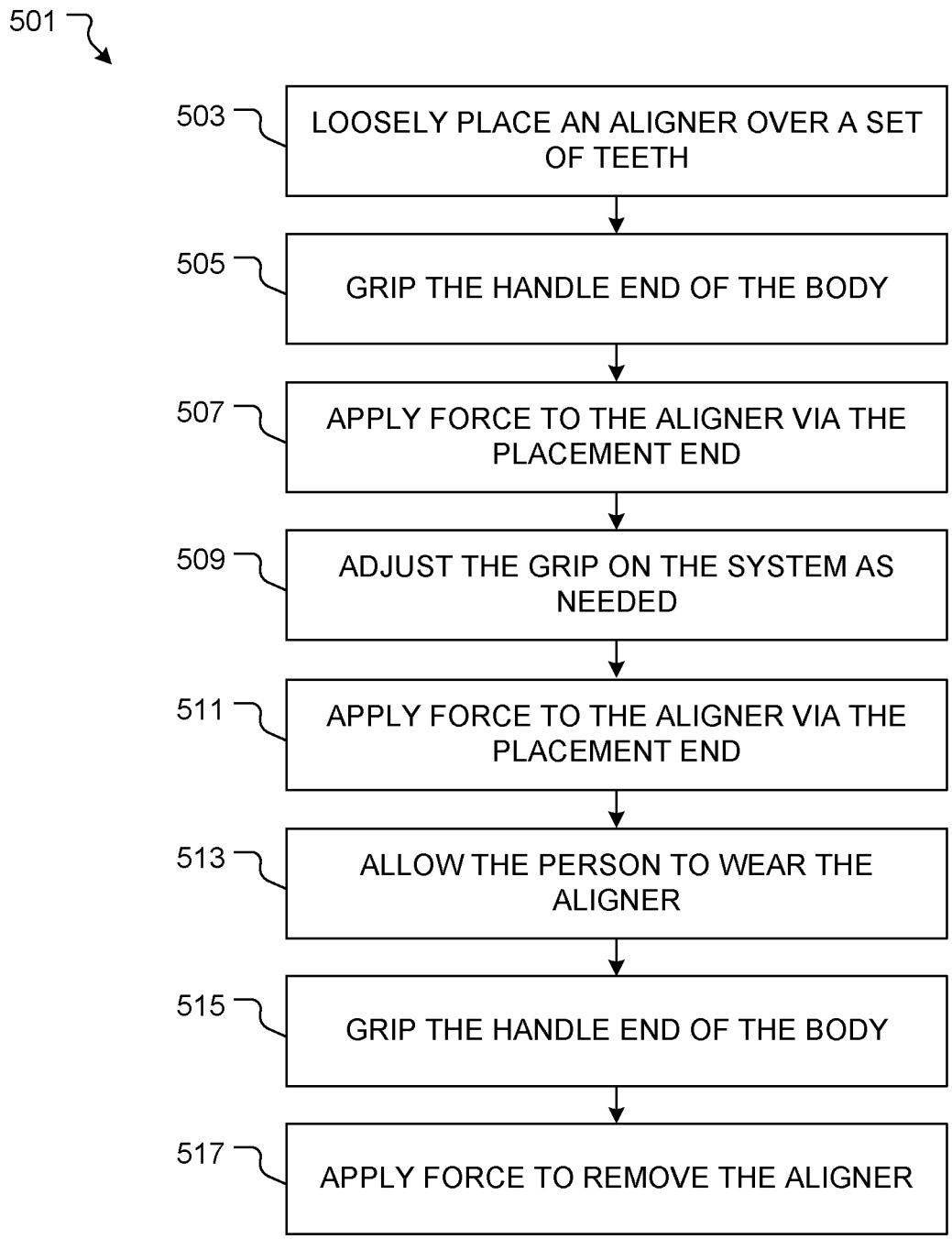
FIG. 5 is a flowchart of the preferred method of use of the system of FIG. 2.

In use, as depicted by FIG. 4, the system 201 is held by a user via the handle end 205 and the placement end is used to apply force to an aligner to seat against the user's teeth.

It should be appreciated that one of the unique features believed characteristic of the present application is that the handle end 205 with its hole 209 allows for the system 201 to be rotated, angled and supported in such a way to allow for precise force to be applied to the aligner. It will be further appreciated that the handle end 205 prevents the system 201 from uncontrolled movement that causes injury to the person or damage to the aligner.

Referring now to FIG. 4 the preferred method of use the system 201 is depicted. Method 501 includes loosely placing an aligner over teeth 503, gripping the handle end of the body 505, applying force to the aligner via the placement end 507, adjusting the grip on the system 509, applying force to the aligner via the placement end to finish the insertion of the aligner 511, allowing the person to wear the aligner 513, gripping the handle end of the body 515 and applying force to remove the aligner 517.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. The method of inserting and removing a dental aligner using an aligner placement system, comprising:
    a body extending from a handle end and a placement end, the body having a first thickness;
    the handle end includes a hole that passes through a thickness of the body; the placement end includes a hook extending out and away from the body, wherein the hook is attached to the body via a rounded support; the placement end is integral with the handle end, the hook having a second thickness; wherein the first thickness is the same as the second thickness;
    wherein the body is to be held by a user via the handle end; loosely placing an aligner over teeth; gripping the handle end of the body; applying force to the aligner via the placement end; adjusting the grip on the system if needed; applying force to the aligner via the placement end to finish the insertion of the aligner; allowing the person to wear the aligner; gripping the handle end of the body; and applying force via the hook to remove the aligner.

* * * * *